July 4, 1950 W. C. MOORE 2,514,285
CODED RANGE-SIGNAL RESPONSIVE SYSTEM
Filed July 24, 1944 3 Sheets-Sheet 2

INVENTOR.
WILLIAM CULLEN MOORE
BY Mueller, Dodds & Mason
ATTORNEYS

*INVENTOR.*
WILLIAM CULLEN MOORE
BY Mueller, Dodds & Mason
ATTORNEYS

Patented July 4, 1950

2,514,285

UNITED STATES PATENT OFFICE 2,514,285

CODED RANGE-SIGNAL RESPONSIVE SYSTEM

William Cullen Moore, Chicago, Ill., assignor to Motorola, Inc., a corporation of Illinois Application July 24, 1944, Serial No. 546,387

25 Claims. (Cl. 343—110)

This invention relates to coded range-signal responsive systems for aircraft and more particularly to such systems by means of which there may be derived an effect representative of the quadrant in which the aircraft is flying, such effect being either a visual indication or an electrical effect utilizable for navigational control purposes.

It is well-known that one of the basic radio-navigational aids to commercial aviation is the radio range or coded radio-range signalling system. Briefly, this system comprises a series of transmitters spaced at intervals along an air route, each sending out a given pulse-coded, tone-modulated wave signal in opposite quadrants and a differently coded signal in the intervening quadrants, the division between the quadrants lying along the course of the route. The aircraft pilot, by listening to the received code signals, can determine the quadrant in which he is flying and, by referring to a chart or map, can determine on which side of the desired course he is proceeding. In the system in most general use, the so-called A-N system, signals in the adjacent quadrant are pulse-coded to represent the Morse code letters A and N which are complementary so that, when on the true course, the pulses of one coded signal fill in the gaps of the other coded signal and the pilot hears in his receiver a continuous tone of constant amplitude.

However, the range systems in use have involved the continuous use of headphones by the pilot, which tends to distract him from his many other duties and is subject to the defects or limitations on the sensitivity of the pilot's hearing. It is desirable to provide a coded range-signal system which is not dependent upon the continuous use of headphones for audible reception.

It is an object of the invention, therefore, to provide a new and improved coded range-signal responsive system which avoids the continuous audible reception of a coded range signal.

It is another object of the invention to provide a new and improved coded range-signal responsive system by means of which there may be obtained an electrical or mechanical effect or signal representative of the quadrant in which the aircraft is flying, which effect may be utilized for visual indication or for navigational control purposes.

For a better understanding of the invention, together with other and further objects thereof, reference is had to the following description taken in connection with the accompanying drawings while its scope will be pointed out in the appended claims.

In accordance with the invention, in a coded-pulse ranging system, an aircraft range-responsive system comprises means for receiving and detecting the range signals, means for deriving a pulse wave comprising pulses occurring only at edges of the pulses of the received range signal, and means responsive to the time separation of the derived pulses for developing an effect representative of the quadrant in which the aircraft is flying.

Further in accordance with the invention, in a system of the type described, the means for deriving the pulse wave from the received range signal comprises means for differentiating the detected range signal to develop a derived pulse wave and means for rectifying such derived pulse wave, the time-responsive means being responsive to the time separation of the pulses of such rectified wave.

Further in accordance with one form of the invention, the means responsive to the time separation of the derived pulses comprises means for generating a control pulse wave having pulses of a duration greater than the least time separation of one of the detected range signals and less than that of the other of the detected range signals, the means for developing the quadrant-representative effect being means responsive jointly to the derived pulse wave and the developed control pulse wave.

In accordance with another form of the invention, the time responsive means comprises means for integrating the pulse wave derived from the detected range signal and means responsive to the peak amplitude of the integrated wave for developing the quadrant-representative effect, as described.

Further in accordance with a preferred form of the invention, the range responsive system includes also means for developing an effect varying with the deviation of the aircraft from the junction of adjacent ranges, this effect being utilized either independently or for modifying the quadrant-representative effect in order to derive an effect representative of the position of the aircraft in the range system.

Referring now to the drawings, Fig. 5 is a circuit diagram of a modified form of the means responsive to the time separation of the derived pulses which may be utilized in the complete system of Fig. 1; while

Figure 1:
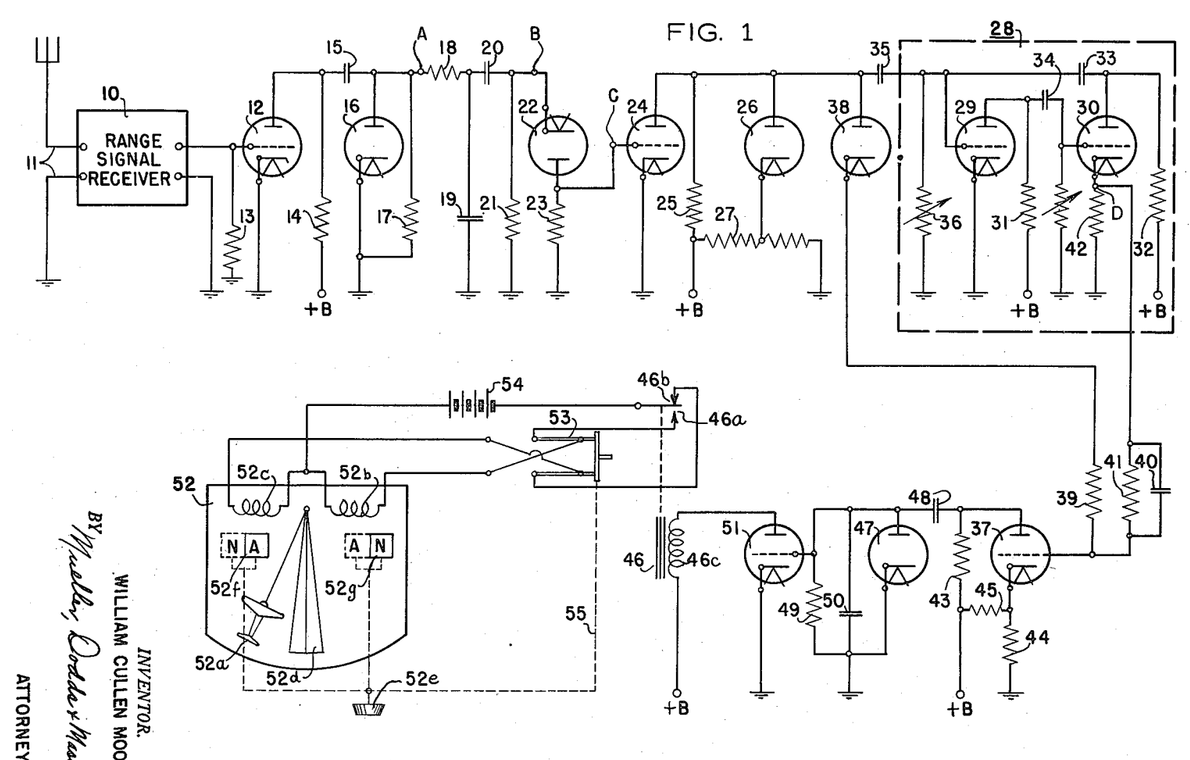
Fig. 1 is a circuit diagram, partially schematic, of a complete coded range-signal responsive system embodying the invention.

Referring now to Fig. 1 of the drawings, there is represented for use in a code pulse-ranging system an aircraft range responsive system comprising means for receiving and detecting the range signals, which may be of any conventional form such as the range signal receiver 10 connected to a receiving antenna 11. The output terminals of the receiver 10 are connected to an amplifier tube 12 provided with a grid leak resistor 13, the anode of the tube 12 being connected to a suitable source +B through a load resistor 14. The output signal from tube 12 appearing across load resistor 14 is a carrier-signal modulated by a pulsed tone-frequency wave. This signal is applied through a coupling capacitor 15 to a diode rectifier 16 provided with a load resistor 17 across which appears the negative half of the modulated signal amplified by tube 12. The output signal developed across the load resistor 17 is then applied to a low-pass filter network comprising a series resistor 18 and a shunt capacitor 19 for eliminating the tone-frequency components to derive a unidirectional pulse wave.

The system also includes means for deriving a pulse wave comprising pulses of predetermined polarity occurring only at the edges of the pulses of the received range signals, this means preferably comprising means for differentiating the detected range signal to develop a derived pulse wave and means for rectifying the derived wave. The differentiating means consists of a series capacitor 20 and a shunt resistor 21 connected across the filter capacitor 19, while the rectifying means consists of a diode rectifier 22 in series with a load resistor 23 connected across the resistor 21 of the differentiating means. The derived pulse wave developed across the load resistor 23 is applied to an amplifier tube 24, the anode of which is connected to a source +B, as indicated, through a load resistor 25. The amplified pulse wave developed across resistor 25 is limited or clipped by means of a diode 26 connected thereacross and having its cathode biased positively by means of a voltage divider resistor 27 connected across the source +B.

The system also includes means responsive to the time separation of the pulses of the derived wave, that is, the rectified differentiated wave developed across the load resistor 23 and amplified in the tube 24 for developing an effect representative of the range in which the aircraft is flying. Preferably this means includes a pulse wave generator for developing a control pulse wave consisting of pulses of a duration greater than the least time separation of one of the detected range signals and less than that of the other of the detected range signals. This pulse generator may be of any of several well-known types there being illustrated by way of example a multivibrator 28. This multivibrator 28 includes a pair of vacuum tubes 29 and 30 having load resistors 31 and 32, respectively, and energized from a suitable source +B. The two tubes are cross coupled, that is, the control electrode of tube 29 is coupled to the anode of tube 30 by means of a coupling capacitor 33 while the control electrode of tube 30 is coupled to the anode of tube 29 through a coupling capacitor 34. The input electrode of the tube 29 is synchronized by the amplified derived pulse wave developed across resistor 25 by means of a circuit including a coupling capacitor 35 and a variable grid resistor 36, which is provided for adjustment of the width of the pulses generated by the multivibrator 28.

The time-responsive means also includes means responsive jointly to the derived pulse wave and the control pulse wave for developing the range representative effect. This last named means comprises a vacuum tube key or amplifier 37 for repeating the derived pulse waves which are applied to its input electrode from the load resistor 25 through a diode rectifier 38 and a coupling resistor 39. The key 37 is also provided with a circuit for keying it with the pulse wave generated by multivibrator 28, this circuit comprising a coupling capacitor 40 shunted by a grid leak 41 and being connected across a cathode load resistor 42 of tube 30 of multi-vibrator 28. The anode of key 37 is supplied from a suitable source +B through a load resistor 43 while its cathode is biased positively from a resistor 44 forming with a resistor 45 a voltage divider connected across the source +B.

The effect representative of the range in which the aircraft is flying may be a signal, either electrical or mechanical. In the system described, an electrical signal is developed in the output circuit of the key 37 whenever the derived pulses from the load resistor 25 and the keying pulses from the multivibrator 28 are simultaneously applied to its input electrode; that is, only when the aircraft is in one of the predetermined signal ranges. The system also includes a visual indicator responsive to this signal and comprising a two-position relay 46 having normally open and normally closed contacts 46a and 46b, respectively, and an energizing winding 46c excited by the electrical signal developed by the key 37. The exciting circuit for the winding 46c includes a diode rectifier 47 coupled across load resistor 43 by means of a coupling capacitor 48 and provided with a load circuit comprising a parallel-connected resistor 49 and capacitor 50, this load circuit being connected to the control electrode of a vacuum tube amplifier 51 having an anode circuit including the winding 46c and energized from a suitable source +B.

The visual indicator also includes means controlled by the relay 46 for developing distinctive effects individually representative of each of the ranges when the aircraft is flying therein. Specifically, this means comprises a two-position, zero-center indicator or meter 52 provided with an indicator or pointer 52a actuated by the windings 52b, 52c to one side or the other of its zero position, which is indicated by the representation of a beam 52d on the face of the meter. The windings 52b and 52c are selectively energized by means of the contacts 46a and 46b, respectively, or vice versa, by means of a two-pole double throw switch 53 and a suitable current source, such as a battery 54. The indicator 54 includes a manually operable means for controlling its electrical connections in accordance with the direction from which the aircraft is approaching the source of range signals. This means consists of a lever or knob 52e connected by the linkage mechanism 55, represented in dashed lines, with a pair of range indicators A-N and N-A associated with the windows 52f and 52g, respectively, in the face of the meter. The linkage 55 is also connected to the double throw switch 53 for simultaneous operation of this switch and the range indicators N-A and A-N.

Coming now to the operation of the range-signal responsive system of Fig. 1, range signals are picked up on the antenna 11, received in the unit 10, amplified in the amplifier 12 and detected in the diode detector 16 all in a conventional manner. The modulation envelopes of the detected range signals appearing at point A of the output circuit of detector 16 are represented by curves $a$ and $a'$ of Fig. 2, assuming that the plane is operating in the conventional A-N range system now in current use. Curves $a$ and $a'$ represent the Morse code signals A and N, respectively, it being seen that the pulse curve $a$, fit into the intervals of curve $a'$; that is, the two pulse signals are complementary. Each of curves $a$ and $a'$ represents the modulation envelope of the pulse-modulated tone signal resulting from the detection of the received tone signal in the detector 16. The tone modulation component, usually 1020 cycles, is substantially removed by the filter circuit comprising the series resistor 18 and shunt capacitor 19, resulting in a unidirectional signal of the shape of curve $a$ or curve $a'$, depending upon the range in which the aircraft is flying.

Figure 2:
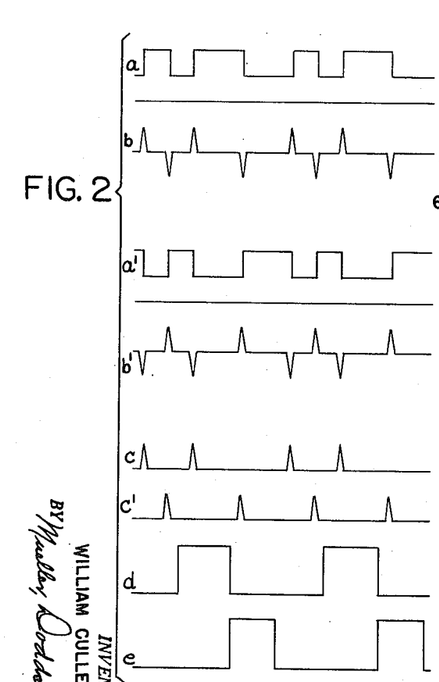
Fig. 2 comprises a series of curves representing operating characteristics of the system of Fig. 1 to aid in the explanation of the invention.

The detected and filtered signal is then differentiated by the circuit comprising the series capacitor 20 and the shunt resistor 21 resulting in the derived pulse wave, curve $b$ or curve $b'$ of Fig. 2, comprising pulses occurring at the leading and trailing edges of the pulses of the wave of curve $a$ or curve $a'$, these derived pulses having a very narrow but substantially constant width; that is, a duration substantially constant but much less than that of any of the range signal pulses. The derived pulse wave of curve $b$ or curve $b'$ appears at point B of the differentiating circuit 20, 21 and is impressed upon the diode rectifier 22 which develops across its load resistor 23, that is, at point C, a pulse wave of the form of either cure $c$ or curve $C'$ of Fig. 2, representing the pulse wave utilized to discriminate between the detected range signals on the basis of the time separation of their respective pulses. The pulse wave of curve $c$ or curve $c'$ is amplified in tube 24 and clipped or limited in the diode rectifier 26 approximately to the value of the unidirectional potential appearing across the portion of the voltage divider 27 utilized to bias the cathode of the diode 26. This clipping or limiting action is effective to stabilize the resultant pulses at a substantially constant amplitude level irrespective of variations in intensity of the received signal.

The derived pulse wave of curve $c$ or curve $c'$ of Fig. 2 is utilized to synchronize the multivibrator 28, which is an entirely conventional circuit the detailed operation of which need not be explained. Briefly, due to the cross coupling between the tubes 29 and 30 of the multivibrator, they turn each other on and off alternately, generating a pulse wave the duration and separation of the pulses of which are dependent primarily upon the time constants of the resistance-capacitance circuits connected to the grids of the tubes. By adjusting the resistor 36, the periodicity of self-oscillation of the multivibrator 28 can be brought to a value only slightly greater than that of the pulses of curve $c$ or curve $c'$ so that the multivibrator is synchronized by these pulses. There is thus developed across the resistor 42 at point D of the multivibrator 28 a pulse wave of the form of curve $d$ of Fig. 2 and this pulse wave is applied positively through the coupling circuit 40, 41 to the control electrode of the repeater 37. It will be noted that the pulse wave of curve $d$ is somewhat delayed with respect to its synchronizing pulse wave, curve $c$; this delay may be obtained by selection of appropriate circuit constants of the coupling circuits or those of the multivibrator 28.

The cathode of the key 37 is normally positively biased by the portion 44 of the voltage divider 44, 45 and the value of this bias is so selected in relation to the amplitude of the pulses derived from point D that the repeater 37 is at or near its cut-off point during the occurrence of the pulses but is biased substantially below cut-off in the intervals therebetween. The limited pulses, curve $c$ or curve $c'$ appearing at the output circuit of the amplifier 24 are also applied to the control electrode of key 37 through the unidirectionally conductive device 38 and an isolating resistor 39. By virtue of the biasing of the key 37, it is effective to repeat only such of the pulses of the pulse waves of curve $c$ or curve $c'$ as occur simultaneously with the pulses of curve $d$.

From Fig. 2 it is evident that the spacing of the pulses of curve $c$, representing the A signal, is such that the second pulse of each pair, the first of which initiates a cycle of the multivibrator 28, occurs during the suceeding pulse of curve $d$ generated thereby so that this second pulse is repeated and amplified by the key 37. This repeated pulse is applied by a coupling capacitor 48 to the diode rectifier 47 having a shunt load circuit 49, 50 having a long time constant effective to develop a unidirectional signal approximately equal to the peak value of the repeated pulses. The time constant of the circuit 49, 50 is also preferably sufficiently long to maintain this unidirectional signal during the identification-signal interval between successive transmissions of range signals, which usually is about 7 seconds. The unidirectional signal developed across the load circuit 49, 50 from the pulses of curve $c$ is applied as a negative bias to amplifier 51 the output circuit of which includes winding 46c of the relay 46 so that, when A-quadrant signals are being received, relay 46 is de-energized.

On the other hand, it will be seen from the curves of Fig. 2 that none of the pulses of curve $c'$ corresonding to the N-quadrant signals, occur during the generated pulses of curve $d$ so that no output signal is developed by the key 37, no negative bias is developed and applied to amplifier 51, and relay 46 is energized. That is, the control pulse wave of curve $d$ comprises pulses of a duration greater than the least time separation of the detected A-quadrant signals and less than that of the detected N-quadrant signals. The key 37 comprises means responsive jointly to the derived pulse wave of curve $c$ or curve $c'$ and the control pulse wave of curve $d$ for developing an electrical signal only during the reception of the A-quadrant signals.

As stated above, the electrical signal developed by the key 37 and the rectifier 47 is applied as a negative bias to the amplifier 51 to control the excitation of the two-position relay 46. When the relay 46 is in a de-energized position, corresponding to the reception of A-quadrant signals as illustrated, and with the two-position switch 53 also in the position illustrated, it will be seen that the winding 52c of the zero-center meter 52 is energized from the battery 54. Such position of the switch 53 corresponds to the position of indicators N-A and A-N of the meter 52 as shown so that the symbols A and N appear in the windows 52f and 52g, respectively, while the pointer 52a is deflected to the left adjacent the window 52f. Thus the meter 52 indicates that the aircraft is flying in the A-quadrant. It will be understood that, in operating the system, the pilot will refer to his range chart to determine the relative location of the A and N quadrants for the particular direction in which he is approaching the range beacon. He will then operate the knob or lever 52e to shift the indicators A-N and N-A and to throw the switch 53 into the position corresponding thereto so that, under all conditions, the position of the indicator with respect to the A or N side of the meter will be correct.

From the foregoing explanation it will be apparent that, upon reception of an N-quadrant signal, the pulses of curve $c'$ are not repeated in key 37 and no unidirectional bias is developed across the load circuit 49, 50 so that the relay 46 is energized by the amplifier 51 to close its contact 46a, thus energizing the winding 52b of the meter 52 which deflects the pointer 52a to the opposite side to indicate to the pilot that he is flying in the N-quadrant.

Figure 3:
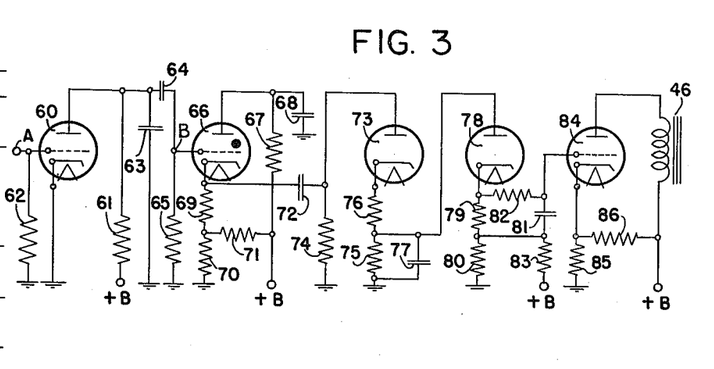
Fig. 3 is a circuit diagram of an alternative arrangement responsive to the time separation of the derived pulse wave.

In Fig. 3 there is represented a modification of a portion of the range-responsive system of Fig. 1 embodying different means responsive to the time separation of the derived pulses. The circuit prior to the point A in the channel may be identical to that of Fig. 1 and therefore is omitted for the sake of simplicity. The detected pulse wave, curve $a$ or curve $a'$ of Fig. 2, is impressed upon the control electrode of a vacuum tube amplifier 60 having an anode circuit including a load resistor 61 and a filter capacitor 63 and energized from a suitable source +B, its control electrode being provided with a grid leak resistor 62. The filtered pulse wave developed across resistor 61 is then applied to a differentiating circuit comprising a series capacitor 64 and shunt resistor 65, the differentiated pulse, represented by curve $b$ or curve $b'$ of Fig. 4, being developed across the resistor 65. The pulse wave of curve $b$ or curve $b'$ appearing at the point B is applied to the input electrode of a vapor-electric discharge tube 66 which may be of the "Thyratron" type including in its output circuit a self-quenching or suppressing circuit comprising an anode load resistor 67 and shunt capacitor 68. The constants of the elements 67 and 68 are such that the current through the tube 66 extinguishes itself after a brief pulse, as is well understood in the art. The tube 66 is provided with cathode load resistors 69, 70, these resistors forming with a resistor 71 a voltage divider across the source +B, as indicated, for normally biasing the tube 66 to a non-conductive state.

The range signal responsive system of Fig. 3 also includes means for integrating the derived wave comprising a rectifier including a load circuit having a time constant substantially longer than the least time separation of the detected A-range signals and substantially less than that of the detected N-range signals. This means comprises a rectifier 73 provided with a load circuit including resistors 74, 75 and 76 in series, the resistor 75 being shunted by a capacitor 77 and forming therewith a time constant circuit as described. The amplified pulses of curve $c$ or curve $c'$ appearing across the load circuit 69, 70 are applied to the rectifier 73 through a coupling capacitor 72.

The system of Fig. 3 also includes means responsive to the peak amplitude of the integrated wave for developing an effect representative of the range in which the aircraft is flying. Specifically, the integrated signal appearing across the time constant circuit 75, 77 is applied to a diode peak rectifier 78 having a load circuit including resistors 79 and 80 in series, the resistor 79 being shunted by a capacitor 81 through a resistor 82, the time-constant circuit 79, 81, 82 having a time constant of at least several seconds. The diode 78 is biased by the resistor 80 forming with a resistor 83 a voltage divider circuit connected across the source +B so that the diode 78 rectifies only applied pulses of greater than a predetermined amplitude. The integrated, peak rectified pulses appearing across load circuit 79, 80 are applied to an amplifier 84 normally biased at or beyond cut-off by means of a voltage divider comprising resistors 85, 86 connected across the source +B. The output circuit of amplifier 84 includes the winding of relay 46.

The operation of the system of Fig. 3 may be explained with reference to the curves of Fig. 4. The detected, filtered and differentiated pulse wave of curve $b$ or curve $b'$ developed at the point B in a manner similar to the arrangement of Fig. 1 are utilized to key or trigger the vapor-electric tube 66 and its relaxation circuit so that there appear in its cathode load circuit 69, 70 amplified positive pulses only of substantially the same wave form and duration as the pulses of curve $b$ or curve $b'$. These pulses are applied to the rectifier 73 having in its load circuit the time constant circuit 75, 77 the value of the time constant of which is such that the capacitor 77 is charged by successive pulses but is substantially discharged in the interval corresponding to the least time separation of the positive pulses of curve $b'$, corresponding to N-quadrant signals, the capacitor voltage being represented by curve $g$ of Fig. 4. As a result, the maximum value of the signal developed across the load circuit 75, 77 does not exceed the value $x$, representing the delay bias, impressed on the cathode of the diode 78 from voltage divider 80, 83. Therefore, when N-quadrant signals are being received, no signals are rectified by the diode 78, no signal is impressed upon the vacuum tube amplifier 84, and the relay 46 remains de-energized so that the meter 52 of Fig. 1 indicates that the aircraft is operating in the N-quadrant.

Figure 4:
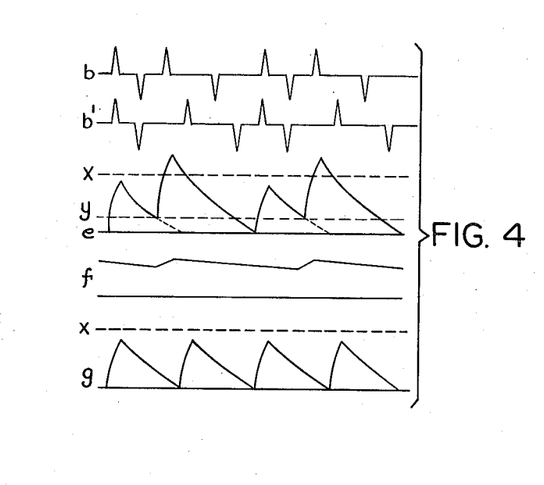
Fig. 4 is a series of curves or graphs representing operating characteristics of the circuit of Fig. 3 to aid in the explanation of the invention.

However, the time constant of the circuit 75, 77 is such that the capacitor 77 discharges only to the level $y$ of Fig. 4 during the interval corresponding to the least time separation of the derived pulses of curve $b$, corresponding to the A-quadrant signals. As a result, upon the occurrence of the second positive pulse of curve $b$ of each pair of adjacent pulses, the condenser 77 is given an additional increment of charge which carries its potential substantially above the valve of the delay bias $x$, as represented by curve $e$, Fig. 4. The portions of the pulses of curve $e$ in excess of the delay bias $x$ are rectified in the peak rectifier 78. The load circuit 79, 81, 82 of this rectifier has a long time-constant charging circuit 81, 82 so that it is substantially unresponsive to the identification signals transmitted during the interval between successive transmissions of range signals. In addition, it has a conventional long time-constant discharging circuit 79, 81, 82 to enable it to function as a peak rectifier, deriving from the intermittent pulses of curve e in excess of the delay bias x a continuous unidirectional potential for application to the amplifier 84 and relay 46. Thus, as in the arrangement of Fig. 1, the relay 46 is either energized or de-energized in accordance with whether the aircraft is operating in the A-range or the N-range and correspondingly controls the zero-center meter 52 to provide a visual indication thereof. However, it is to be noted that, in this modification of the invention, the operation of relay 46 is reversed with respect to that of the Fig. 1 system, being energized upon the reception of A-range signals and de-energized upon the reception of N-range signals, so that the connections to the meter 52 are to be reversed with respect to those of Fig. 1.

Figure 5:
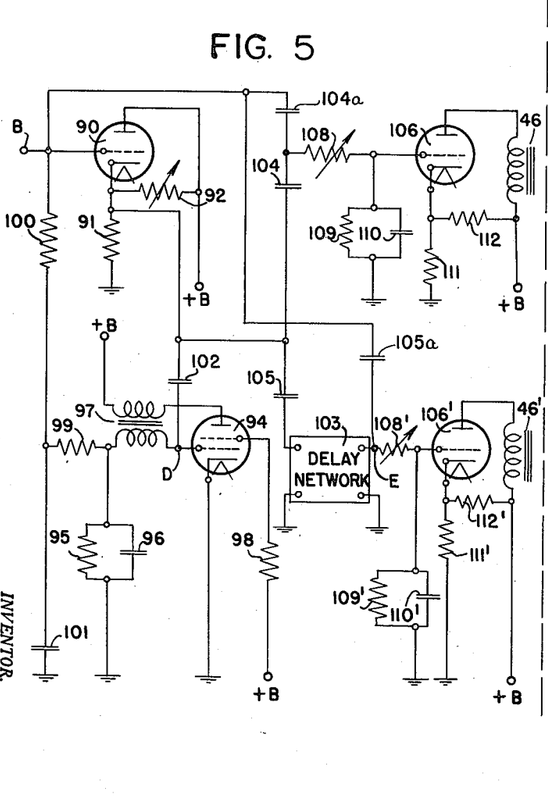

Referring now to Fig. 5, there is represented a modification of a portion of the system of Fig. 1 for positively developing an electrical signal upon the reception of either A-quadrant or N-quadrant range signals. In this case the detected filtered and differentiated pulse wave of curve b or curve b' of Fig. 2 developed at point B in the channel of Fig. 1 is applied to the control electrode of a vacuum tube amplifier 90 having a cathode load resistor 91 which, with an adjustable resistor 92, constitutes a voltage divider connected across the source +B which also supplies space current to the tube 90. The amplified pulse wave corresponding to the pulses of curve b or curve b' of Fig. 2 is applied to the control grid of a vacuum tube 94 connected as a conventional blocking oscillator; that is, its control electrode circuit includes a time-constant circuit comprising a resistor 95 and a capacitor 96 in parallel while the anode circuit is regeneratively coupled to the control electrode circuit through a feed-back transformer 97. The anode of the tube 94 is energized from a source +B while its screen electrode is similarly energized through a dropping resistor 98. The time-constant circuit 95, 96 is also coupled to point B through a filter circuit comprising series resistors 99, 100 and a shunt capacitor 101. The blocking oscillator described constitutes means for generating a control pulse wave which may be used interchangeably with the multivibrator 28 of Fig. 1, the circuit constants being so selected that the generated pulses are of a duration greater than the least time separation of the detected A-range signals and less than that of the detected N-range signals.

The pulse wave developed by the blocking oscillator at the point D is somewhat delayed, as indicated in Fig. 2, by the circuit constants of the blocking oscillator and its coupling circuit. This pulse wave, curve d, is applied through a coupling capacitor 102 and a coupling capacitor 104 to a repeater means such as the vacuum tube repeater 106. The repeater 106 is provided with a control electrode circuit for keying the repeater with the generated pulse wave of curve d comprising the coupling condenser 104 and adjustable grid resistor 108 and a grid biasing circuit comprising a grid leak resistor 109 and shunt condenser 110. The repeater 106 is also provided with a cathode load resistor 111 which, with a resistor 112, comprise a voltage divider circuit across the source +B.

The pulse wave of the blocking oscillator 94 is also applied to a second repeater 106' through a delay network 103, which is effective to delay by an amount not less than the least time separation of the detector A range signals. The repeater 106' and its associated circuits are, with the exception of the additional delay network 103, identical to those of the repeater 106, corresponding elements being identified by the same reference numerals primed, so that description thereof need not be repeated. The point B is also coupled to the repeaters 106 and 106' through coupling condensers 104a and 105a, respectively.

The operation of the system of Fig. 5 will be apparent from the foregoing description in conjunction with the explanation of the operation of the preceding modifications. Briefly, the detected, filtered, and differentiated pulses of curve b or curve b' are repeated by the amplifier 90 and applied with the same polarity from its cathode load resistor 91 through the coupling capacitor 102 to synchronize the blocking oscillator 94. The oscillator 94 generates a pulse wave, curve d, Fig. 2, similar to that generated by the multivibrator 28 of the system of Fig. 1 and slightly delayed with respect to the synchronizing pulse wave, curve b or curve b'. This pulse wave is applied to the control electrode of the repeater tube 106 to which is also applied the derived pulse wave of curve b or curve b' from point B through capacitor 104a. The repeater 106 therefore operates in a manner analogous to the repeater 37 of Fig. 1, energizing the relay 46 only upon the reception of A-quadrant signals. At the same time the pulse wave, curve d, Fig. 2, is delayed by the network 103 to develop the pulse wave, curve e, Fig. 2. The amount of the delay is greater than the separation of the closest positive pulses of curve b (same as curve c) derived from the A-quadrant signals so that the repeater 106' does not respond to the A-quadrant signals supplied to its control electrode through the coupling capacitor 105a. However, the delay of the pulse wave curve e is less than the least time separation of the N-quadrant signals so that the repeater 106' is keyed to respond to the next successive positive pulse of curve b' (same as curve c') derived from the N-quadrant signals and, therefore, is effective to energize its associated relay 46' when the aircraft is operating in the N-quadrant. The relays 46 and 46' may individually control the excitation of the windings 52b, 52c of the indicator of the system of Fig. 1 through a reversing switch 53 in substitution for the two-position relay 46 of Fig. 1.

Figure 6:
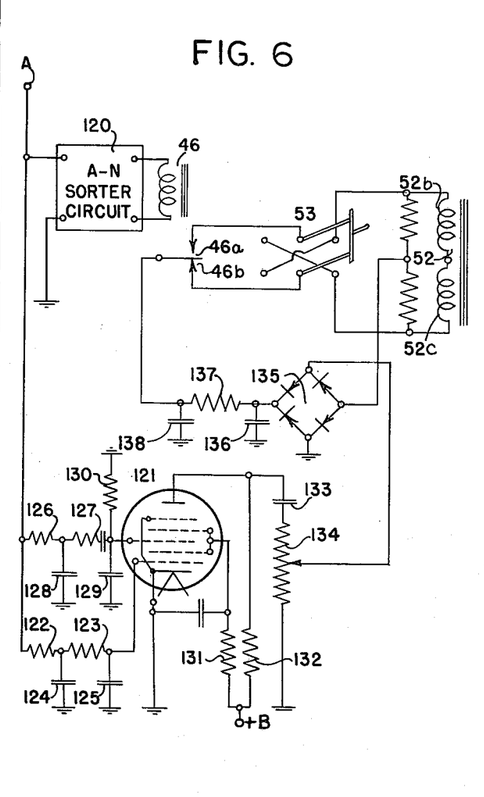
Fig. 6 is a circuit diagram, partially schematic, of a feature of the invention which may be incorporated in the systems of any of Figs. 1, 3 and 5 for deriving an effect representative of the deviation of the aircraft from the junction of two adjacent signal ranges.

In each of the systems of Figs. 1, 3 and 5 a mechanical or electrical signal is developed which gives an indication only of the quadrant in which the aircraft is flying but does not give an indication of the degree of deviation of the aircraft from the desired course, which is usually the junction of the adjacent quadrants and appears in the form of a narrow-angle beam of steady tone. In Fig. 6 is illustrated a circuit which may be added to the arrangement of any of Figs. 1, 3 and 5, but has been separated therefrom for the sake of simplicity, which circuit includes means for developing an effect varying with the deviation of the aircraft from the junction of adjacent quadrants. The derived pulse wave of curve c or curve c' of Fig. 2 developed at the point C, Fig. 1, is applied to an A-N sorter circuit 120 which, for example, may be comprised of the amplifier 24 and its associated circuits, the multivibrator 28, the repeater 37 and its associated circuits, and the amplifier 51 of Fig. 1. The output circuit of the unit 120 includes the two-position relay 46 which may be identical to that of Fig. 1. The contacts 46a and 46b of relay 46 are connected to the windings 52b and 52c of the indicator or meter 52 through a reversing switch 53 as in the arrangement of Fig. 1. In this instance, however, the energization of the windings of the meter 52 is obtained from means for deriving an effect varying with the effective modulation of the sum of the received range signals, which is representative of the deviation of the aircraft from the junction of adjacent quadrants. This means comprises a combining amplifier tube 121, preferably of the heptode type, as illustrated. To the innermost control electrode are applied the unidirectional pulses of curve a or curve a' through a long time-constant circuit comprising series resistors 122, 123 and shunt capacitors 124 and 125 so that this grid operates as a peak grid rectifier to control the amplification of the tube 121 in accordance with the peak intensity of the signals of curve a or curve a'.

The pulse wave of curve a or curve a' is also applied to the second input grid of the amplifier 121 through a filter circuit comprising series resistors 126 and 127 and shunt capacitors 128 and 129 for filtering out the audio-frequency component, this control electrode being provided with a grid resistor 130. The screen and anode of the tube 121 are energized through resistors 131 and 132, respectively, from a suitable source +B. The output of amplifier 121 appearing across load resistor 132 is applied through a coupling capacitor 133 and voltage divider resistor 134 to a full-wave bridge rectifier circuit 135 which may be of any type but is preferably of the copper-oxide contact type, as indicated. The unidirectional output circuit of the rectifier bridge 135 is connected in place of the battery 54 of the system of Fig. 1 through a long time-constant filter circuit comprising a series resistor 137 and shunt condensers 136 and 138, selectively to energize the windings 52b, 52c of the indicator 52 in accordance with the relative positions of the relay 46 and the reversing switch 53.

The operation of the system of Fig. 6 for developing an electrical signal representative of the quadrant in which the aircraft is flying comprising the unit 120, the relay 46, the reversing switch 53 and the indicator 52 is similar to that of the system of Fig. 1. In accordance with the arrangement of Fig. 6, however, this quadrant effect is modified with the deviation effect; that is, with an effect representative of the deviation of the aircraft from the desired course as measured by the effective modulation of the sum of the received quadrant signals to derive an effect representative of the position of the aircraft in the range system. This modifying effect is derived by the combining amplifier 121 to the second input grid of which is applied the sum of the quadrant signals, of curves a and a' of Fig. 2. If the aircraft is exactly on course, the two range signals are received with equal amplitudes, the pulses of one of the signals exactly fill the gaps of the other signal, and the tone signal appears constant, that is, at continuous 100% modulation.

If, however, the aircraft is to one side or the other of the desired course, either the A-quadrant signal or the N-quadrant signal will predominate and the sum of the two signals will have an apparent or effective modulation at the pulse rate. At the same time, in order to compensate for variations in the peak intensity of the range signals in accordance with the distance of the aircraft from their source, the peak rectifier comprising the inner grid of the tube 121 and the time-constant circuit 122, 123, 124, 125 acts as an automatic amplification control to maintain the output of the amplifier 121 substantially independent of variations in input intensity. The resultant signal output of the amplifier 121, therefore, consists of a pulse signal of an amplitude dependent upon the effective percentage modulation of the sum of the range signals and this pulse signal is rectified by the rectifier 135 to provide a source of excitation for the windings of the indicator 52. Therefore, the direction of deflection of the meter 52 is determined by the quadrant in which the aircraft is flying while the extent of its deflection is determined by the deviation from the beam course, that is, by the effective modulation of the sum of the received quadrant signals. In other words, the meter 52 develops an effect, that is, a deflection, representative of the position of the aircraft in the range system. Thus, the indication of the indicator 52 constitutes a visual signal varying in polarity with the quadrant in which the aircraft is operating, specifically its mechanical deflection on either side of the zero position, and varying in amount in accordance with the deviation of the aircraft from the junction of the adjacent quadrants.

While the invention has been illustrated and described in a system for obtaining a visual indication of the relative position of the aircraft in the ranging system, it will be apparent to those skilled in the art that the electrical signal derived to determine such position may be utilized for measuring, indicating and control purposes generally.

While there have been described what are at present considered to be the preferred embodiments of the invention, it will be apparent to those skilled in the art that various changes and modifications may be made therein without departing from the spirit or scope of the invention.

I claim:

1. In a coded-pulse ranging system, an aircraft range-responsive system comprising, means for receiving and detecting the range signals, means for deriving a pulse wave comprising pulses occurring only at edges of the pulses of the received range signal, means governed by said derived pulses for generating sustained control pulses of pre-determined durations in response to certain of said derived pulses, and aperiodic means responsive to the coincidence of others of said derived pulses with said control pulses depending upon the time separation of said derived pulses for developing a continuous effect representative of the quadrant in which said aircraft is flying.

2. In a coded-pulse ranging system, an aircraft range-responsive system comprising, means for receiving and detecting the range signals, means for deriving a pulse wave comprising pulses of substantially constant duration occurring synchronously with the pulses of the received range signal, means governed by said derived pulses for generating sustained control pulses of pre-determined durations in response to certain of said derived pulses, and aperiodic means responsive to the coincidence of others of said derived pulses with said control pulses depending upon the time separation of said derived pulses for developing a continuous effect representative of the quadrant in which said aircraft is flying.

3. In a coded-pulse ranging system, an aircraft range-responsive system comprising, means for receiving and detecting the range signals, means for deriving a pulse wave comprising pulses of a duration substantially constant and much less than that of any of the range-signal pulses and occurring synchronously with the pulses of the received range signal, means governed by said derived pulses for generating sustained control pulses of pre-determined durations in response to certain of said derived pulses, and aperiodic means responsive to the coincidence of others of said derived pulses with said control pulses depending upon the time separation of said derived pulses for developing a continuous effect representative of the quadrant in which said aircraft is flying.

4. In a coded-pulse ranging system, an aircraft range-responsive system comprising, means for receiving and detecting the range signals, means for deriving a pulse wave comprising pulses of predetermined polarity occurring at the edges of the pulses of the received range signal, means governed by said derived pulses for generating sustained control pulses of predetermined durations in response to certain of said derived pulses, and aperiodic means responsive to the coincidence of others of said derived pulses with said control pulses depending upon the time separation of said derived pulses for developing a continuous effect representative of the quadrant in which said aircraft is flying.

5. In a coded-pulse ranging system, an aircraft range-responsive system comprising, means for receiving and detecting the range signals, means for deriving a pulse wave comprising pulses occurring only at the leading edges of the pulses of the received range signal, means governed by said derived pulses for generating sustained control pulses of predetermined durations in response to certain of said derived pulses, and aperiodic means responsive to the coincidence of others of said derived pulses with said control pulses depending upon the time separation of said derived pulses for developing a continuous effect representative of the quadrant in which said aircraft is flying.

6. In a coded-pulse ranging system, an aircraft range-responsive system comprising, means for receiving and detecting the range signals, means for deriving a pulse wave comprising pulses of substantially constant duration and of predetermined polarity occurring only at the edges of the pulses of the received range signal, means governed by said derived pulses for generating sustained control pulses of predetermined durations in response to certain of said derived pulses, and aperiodic means responsive to the coincidence of others of said derived pulses with said control pulses depending upon the time separation of said derived pulses for developing a continuous effect representative of the quadrant in which said aircraft is flying.

7. In a coded-pulse ranging system, an aircraft range-responsive system comprising, means for receiving and detecting the range signals, means for differentiating the detected signal to develop a derived pulse wave, means governed by said derived pulses for generating sustained control pulses of predetermined durations in response to certain of said derived pulses, and aperiodic means responsive to the coincidence of others of said derived pulses with said control pulses depending upon the time separation of said derived pulses for deriving a continuous effect representative of the quadrant in which said aircraft is flying.

8. In a coded-pulse-ranging system, an aircraft range-responsive system comprising, means for receiving and detecting the range signals, means for differentiating the detected signal to develop a derived pulse wave, means for rectifying said derived pulse wave, means governed by the pulses of said rectified wave for generating sustained control pulses of predetermined durations in response to certain of such rectified pulses, and aperiodic means responsive to the coincidence of others of such rectified pulses with said control pulses depending upon the time separation of the pulses of said rectified wave for deriving a continuous effect representative of the quadrant in which said aircraft is flying.

9. In a coded-pulse ranging system, an aircraft range-responsive system comprising, means for receiving and detecting the range signals, means for deriving a pulse wave comprising pulses occurring only at edges of the pulses of the received range signal, means governed by said derived pulses for generating sustained control pulses of predetermined durations in response to certain of said derived pulses, and aperiodic means for discriminating between the detected range signals on the basis of coincidence or lack of coincidence between others of said derived pulses and said control pulses according to the time separation of the respective derived pulses for developing a continuous effect representative of the quadrant in which said aircraft is flying.

10. In a coded-pulse ranging system, an aircraft range-responsive system comprising, means for receiving and detecting the range signals, means for deriving a pulse wave comprising pulses occurring only at edges of the pulses of the received range signal, means for generating a control pulse wave having pulses of a duration greater than the least time separation of one of the detected range signals and less than that of the other of the detected range signals, and means responsive jointly to said derived pulse wave and said control pulse wave for developing an effect representative of the quadrant in which said aircraft is flying.

11. In a coded-pulse ranging system, an aircraft range-responsive system comprising, means for receiving and detecting the range signals, means for deriving a pulse wave comprising pulses occurring only at edges of the pulses of the received range signal, means for generating a control pulse wave having pulses of a duration greater than the least time separation of one of the detected range signals and less than that of the other of the detected range signals, keying means for keying said derived pulse waves, a circuit for keying said keying means with said generated pulse wave, and means controlled by said keying means for developing an effect representative of the quadrant in which said aircraft is flying.

12. In a coded-pulse ranging system, an aircraft range-responsive system comprising, means for receiving and detecting the range signals, means for deriving a pulse wave comprising pulses occurring only at edges of the pulses of the received range signal, means for generating a control pulse wave having pulses of a duration greater than the least time separation of one of the detected range signals and less than that of the other of the detected range signals, means for delaying said generated wave by an amount not less than the least time separation of said one of said detected range signals, a pair of keying means for keying said derived pulse waves, a circuit for keying one of said keying means with said generated wave, a circuit for keying the other of said keying means with said delayed wave, and means controlled by said keying means for developing an effect representative of the quadrant in which said aircraft is flying.

13. In a coded-pulse ranging system, an aircraft range-responsive system comprising, means for receiving and detecting the range signals, means for deriving a pulse wave comprising pulses occurring only at corresponding edges of the pulses of the received range signal, means for integrating the derived pulse wave, and means responsive to the peak amplitude of said integrated wave when the derived pulses have a predetermined time separation for developing an effect representative of the quadrant in which said aircraft is flying.

14. In a coded-pulse ranging system, an aircraft range-responsive system comprising, means for receiving and detecting the range signals, means for deriving a pulse wave comprising pulses occurring only at corresponding edges of the pulses of the received range signal, means for integrating the derived pulse wave comprising a rectifier including a load circuit having a time constant substantially longer than the least time separation of one of the detected range signals and substantially less than that of the other of the detected range signals, and a peak rectifier including a load circuit having a time constant substantially greater than the longest interval between successive range signals for developing an effect representative of the quadrant in which said aircraft is flying when said detected range signals have a predetermined time separation.

15. In a coded-pulse ranging system, an aircraft range-responsive system comprising, means for receiving and detecting the range signals, means for deriving a pulse wave comprising pulses occurring only at edges of the pulses of the received range signal, aperiodic means responsive to the time separation of said derived pulses of a predetermined polarity for developing a continuous effect representative of the quadrant in which said aircraft is flying, and means for developing an effect varying with the deviation of the aircraft from the junction of adjacent quadrants.

16. In a coded-pulse ranging system, an aircraft range-responsive system comprising, means for receiving and detecting the range signals, means for deriving a pulse wave comprising pulses occurring only at edges of the pulses of the received range signal, means responsive to the time separation of said derived pulses for developing an effect representative of the quadrant in which said aircraft is flying, and means for deriving an effect varying with the effective modulation of the sum of the received range signals and representative of the deviation of the aircraft from the junction of adjacent quadrants.

17. In a coded-pulse ranging system, an aircraft range-responsive system comprising, means for receiving and detecting the range signals, means for deriving a pulse wave comprising pulses occurring only at edges of the pulses of the received range signal, means responsive to the time separation of said derived pulses for developing an effect representative of the quadrant in which said aircraft is flying, means for developing an effect varying with the deviation of the aircraft from the junction of adjacent quadrants and means for modifying the quadrant effect with the deviation effect to derive an effect representative of the position of the aircraft in the range system.

18. In a coded-pulse ranging system, an aircraft range-responsive system comprising, means for receiving and detecting the range signals, means for deriving a pulse wave comprising pulses occurring only at edges of the pulses of the received range signal, means responsive to the time separation of said derived pulses for developing an effect respresentative of the quadrant in which said aircraft is flying, means for deriving an effect varying with the effective modulation of the sum of the received range signals, and means for modifying the quadrant effect with the modulation effect to derive an effect representative of the position of the aircraft in the range system.

19. In a coded-pulse ranging system, an aircraft range-responsive system comprising, means for receiving and detecting the range signals, means for deriving a pulse wave comprising pulses occurring only at edges of the pulses of the received range signal, means governed by said derived pulses for generating sustained control pulses for predetermined durations in response to certain of said derived pulses, and aperiodic means responsive to the coincidence of others of said derived pulses with said control pulses depending upon the time separation of said derived pulses for developing a continuous electrical signal representative of the quadrant in which said aircraft is flying.

20. In a coded-pulse ranging system, an aircraft range-responsive system comprising, means for receiving and detecting the range signals, means for deriving a pulse wave comprising pulses occurring only at edges of the pulses of the received range signal, means governed by said derived pulses for generating sustained control pulses of predetermined durations in response to certain of said derived pulses, and aperiodic means responsive to the coincidence of others of said derived pulses with said control pulses depending upon the time separation of said derived pulses for developing a continuous signal varying in polarity in accordance with the quadrant in which said aircraft is flying.

21. In a coded-pulse ranging system, an aircraft range-responsive system comprising, means for receiving and detecting the range signals, means for deriving a pulse wave comprising pulses occurring only at edges of the pulses of the received range signal, means governed by said derived pulses for generating sustained control pulses of predetermined durations in response to certain of said derived pulses, aperiodic means responsive to the coincidence of others of said derived pulses with said control pulses depending upon the time separation of said derived pulses for developing a continuous electrical signal representative of the quadrant in which said aircraft is flying, and a visual indicator responsive to said signal.

22. In a coded-pulse ranging system, an aircraft range-responsive system comprising, means for receiving and detecting the range signals, means for deriving a pulse wave comprising pulses occurring only at edges of the pulses of the received range signal, means responsive to the time separation of said derived pulses for developing an electrical signal only when said aircraft is flying in one of the quadrants, a two-position relay actuated by said signal, and means controlled by said relay for developing distinctive effects individually representative of each of the quadrants when said aircraft is flying therein.

23. In a coded-pulse ranging system, an aircraft range-responsive system comprising, means for receiving and detecting the range signals, means for deriving a pulse wave comprising pulses occurring only at edges of the pulses of the received range signal, means responsive to the time separation of said derived pulses for developing an electrical signal only when said aircraft is flying in one of the quadrants, a two-position relay actuated by said signal, and a two-position indicator controlled by said relay and including manually operable means for controlling its electrical connections in accordance with the direction from which the aircraft is approaching the source of range signals, the position of the indicator being representative of the quadrant in which the aircraft is flying.

24. In a coded-pulse ranging system, an aircraft range-responsive system comprising, means for receiving and detecting the range signals, means for deriving a pulse wave comprising pulses occurring only at edges of the pulses of the received range signal, and aperiodic means responsive to the time separation of said derived pulses of a predetermined polarity for developing a continuous signal varying in polarity in accordance with the quadrant in which said aircraft is flying and varying in magnitude in accordance with the deviation of the aircraft from the junction of adjacent quadrants.

25. In a coded-pulse ranging system, an aircraft range-responsive system comprising, means for receiving and detecting the range signals, means for deriving a pulse wave comprising pulses occurring only at edges of the pulses of the received range signal, a zero-center meter responsive to the time separation of said derived pulses and deflectable in either sense in accordance with the quadrant in which said aircraft is flying, and aperiodic means responsive to the deviation of the aircraft from the junction of adjacent quadrants for determining the amount of deflection of said meter, whereby said meter indicates the position of said aircraft in said range system.

WILLIAM CULLEN MOORE.

REFERENCES CITED

The following references are of record in the file of this patent:

UNITED STATES PATENTS

| Number | Name | Date |
|---|---|---|
| 2,157,677 | Runge | May 9, 1939 |
| 2,198,445 | Wesselink | Apr. 23, 1940 |
| 2,271,534 | Bailey | Feb. 3, 1942 |
| 2,290,974 | Kramar | July 28, 1942 |